United States Patent [19]

Headley

[11] Patent Number: 5,366,239
[45] Date of Patent: Nov. 22, 1994

[54] AIR BAG INFLATOR ASSEMBLY

[75] Inventor: Paul S. Headley, Mesa, Ariz.

[73] Assignee: TRW Inc., Lyndhurst, Ohio

[21] Appl. No.: 127,749

[22] Filed: Sep. 27, 1993

[51] Int. Cl.⁵ .............................................. B60R 21/16
[52] U.S. Cl. ................................ 280/728 A; 280/731; 280/743 R
[58] Field of Search .................... 280/728 A, 731, 732, 280/743 R, 741

[56] References Cited

U.S. PATENT DOCUMENTS

| | | | |
|---|---|---|---|
| 3,362,135 | 1/1972 | Chute et al. | 96/71 |
| 3,618,980 | 11/1971 | Leising et al. | 280/736 |
| 3,934,984 | 1/1976 | Marlow et al. | 422/166 |
| 4,877,264 | 10/1989 | Cuevas | 280/731 |
| 4,913,461 | 4/1990 | Cuevas et al. | 280/731 |
| 4,932,212 | 5/1990 | Cuevas et al. | 280/736 |
| 5,106,119 | 4/1992 | Swann et al. | 280/731 |
| 5,141,247 | 8/1992 | Barth | 280/728 A |
| 5,275,431 | 1/1994 | Stephens | 280/728 A |

OTHER PUBLICATIONS

Drawing entitled "D-5 Aerodynamic Spike," published by Unidynamics/Phoenix Defense and Speciality Systems.
Drawing entitled "C-4 Aerodynamic Spike," published by Unidynamics Phoenix, Inc., a subsidiary of UMC industries.

Primary Examiner—Kenneth R. Rice
Attorney, Agent, or Firm—Tarolli, Sundheim & Covell

[57] ABSTRACT

An apparatus (10) includes an inflatable vehicle occupant restraint (12) and an inflator (14) for inflating the restraint (12). The inflator (14) includes an inflator housing (40) which comprises a first structure with an axis (42) and a first annular surface portion (54) facing in a first direction along the axis (42). A second structure (30) has a second annular surface portion (108) facing in a second, opposite direction along the axis (42). A connector member (32) connects the first structure (40) to the second structure (30). The connector member (32) has first and second abutment surface portions (144) and (146) which respectively abut the first and second annular surface portions (54) and (108) of the first and second structures (40) and (30) when the connector member is in an installed position. One of the structures (40) and (30) has a passage (120) through which the connector member (32) is movable longitudinally into the installed position upon movement of the connector member (32) longitudinally through the passage (120).

21 Claims, 5 Drawing Sheets

AIR BAG INFLATOR ASSEMBLY

FIELD OF THE INVENTION

The present invention relates to an apparatus which includes an inflatable vehicle occupant restraint, such as an air bag, and an inflator for inflating the restraint.

BACKGROUND OF THE INVENTION

U.S. Pat. No. 4,913,461 discloses an apparatus which includes an inflatable air bag for restraining a vehicle occupant. The apparatus also includes an inflator for inflating the air bag. The inflator has a cylindrical housing which contains a gas generating material. The gas generating material in the housing rapidly produces a large volume of gas for inflating the air bag when the inflator is actuated. The housing also has a plurality of gas outlet openings for directing the gas to flow outward from the housing to the air bag.

The apparatus disclosed in the '461 patent further includes a mounting plate for mounting the inflator and the air bag on a vehicle steering column. The mounting plate has a flat peripheral wall which is connectable directly to the vehicle steering column. The mounting plate also has a cylindrical wall which projects from the flat peripheral wall. The cylindrical wall of the mounting plate defines a compartment in which the inflator housing is received. After the housing is moved into the compartment in the mounting plate, a retainer ring is moved into the compartment over the housing. The retainer ring is thus moved into a position in which it is located radially between the housing and the cylindrical wall of the mounting plate. The cylindrical wall of the mounting plate is then deformed radially inward against the retainer ring to lock the retainer ring within the compartment in the mounting plate. The retainer ring then blocks the housing from moving out of the compartment, and also holds the air bag against the mounting plate. The inflator housing and the air bag are thus connected to the mounting plate by the retainer ring.

SUMMARY OF THE INVENTION

In accordance with the present invention, an apparatus comprises an inflatable vehicle occupant restraint and an inflating means for inflating the restraint. The inflating means includes an inflator housing which comprises a first structure. The first structure contains a source of inflation fluid for inflating the restraint, and has a plurality of fluid outlet openings. The first structure further has a cylindrical wall surface centered on an axis, and a first annular surface portion facing in a first direction along the axis.

The apparatus also includes a second structure and a connecting means. The second structure has a cylindrical surface extending circumferentially around the axis, and has a second annular surface portion facing in a second direction along the axis opposite the first direction.

The connecting means connects the first structure to the second structure. The connecting means includes an elongated flexible connector member having first and second opposite longitudinal end surfaces. The connector member has an installed position extending circumferentially around the axis of the first structure between the cylindrical wall surface of the first structure and the cylindrical surface of the second structure. The connector member has first and second abutment surface portions which abut the first and second annular surface portions of the first and second structures, respectively, when the connector member is in the installed position. The connector member thus blocks movement of the first and second structures relative to each other when it is in the installed position.

Further in accordance with the invention, one of the first and second structures has surface means for defining a passage through which the connector member can move longitudinally into the installed position in a direction transverse to the axis upon longitudinal movement of the connector member through the passage.

In a preferred embodiment of the invention, the second structure comprises a support member. The support member supports the first structure, which is the inflator housing structure, and the inflatable vehicle occupant restraint on the steering column of a vehicle. The cylindrical surface of the support member defines a cylindrical compartment in which the inflator housing structure is received. The passage extends through the support member tangentially outward from the cylindrical compartment. The connector member is movable longitudinally into the cylindrical compartment and circumferentially around the inflator housing structure upon longitudinal movement of the connector member inwardly through the passage. The connector member is thus installed between the cylindrical surfaces of the inflator housing structure and the support member by moving the connector member longitudinally into the cylindrical compartment and circumferentially around the inflator housing structure.

An apparatus constructed in accordance with the present invention enables the inflator housing structure to be securely connected to the support member without welding between those parts. Specifically, the connector member establishes a mechanical interlock which securely blocks movement of the inflator housing structure relative to the support member. Since the inflator housing structure and the support member are not welded to each other, they can be formed of dissimilar metals, such as steel and aluminum, respectively. Additionally, the connector member can be withdrawn from its installed position by pulling the connector member longitudinally outward from the cylindrical compartment through the passage. The apparatus can thus be disassembled without cutting, deforming or otherwise damaging the inflator housing structure or the support member.

BRIEF DESCRIPTION OF THE DRAWINGS

The foregoing and other features of the present invention will become apparent to those skilled in the art to which the present invention relates upon reading the following description in view of the accompanying drawings, wherein.

DESCRIPTION OF PREFERRED EMBODIMENTS

Figure 1:
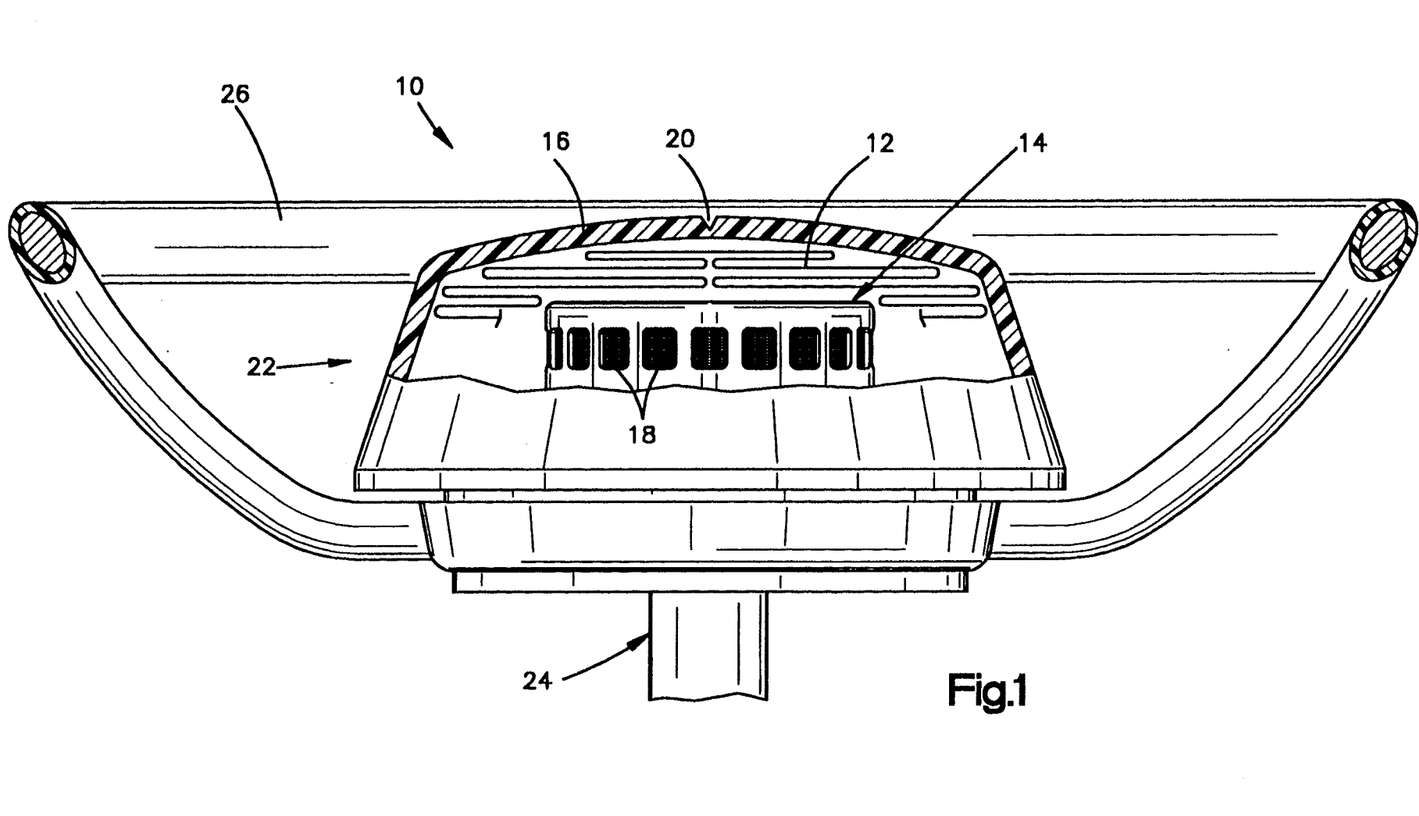
FIG. 1 is a view of a vehicle steering column and a vehicle occupant restraint apparatus constructed as a first embodiment of the present invention.

A first embodiment of the present invention is a vehicle occupant restraint apparatus 10, as shown in FIG. 1. The apparatus 10 includes an inflatable air bag 12, an inflator 14 and a cover 16. The air bag 12 is received over the inflator 14 in a folded condition, as shown schematically in FIG. 1. The inflator 14 has a plurality of outlet openings 18 and contains a source of inflation fluid, such as a gas generating material. Alternatively, the inflator 14 could contain a quantity of stored gas or a combination of gas generating material and stored gas. The cover 16 encloses the air bag 12 and the inflator 14, and has a relatively weak portion 20. The air bag 12, the inflator 14 and the cover 16 are parts of a module 22 which is mounted on a vehicle steering column 24 at the center of the steering wheel 26.

Upon the occurrence of sudden vehicle deceleration, such as occurs in a collision, the inflator 14 is actuated. The inflator 14 then releases the inflation fluid, which is preferably a large volume of inert gas. The inflation fluid emerges from the outlet openings 18 and flows into the air bag 12 to inflate the air bag 12. As the air bag 12 begins to inflate, it moves forcefully against the cover 16 and breaks the cover 16 at the relatively weak portion 20. As the air bag 12 continues to inflate, it moves outward past the broken cover 16 and into the space between the driver of the vehicle and the steering wheel 26 to restrain movement of the driver.

Figure 2:
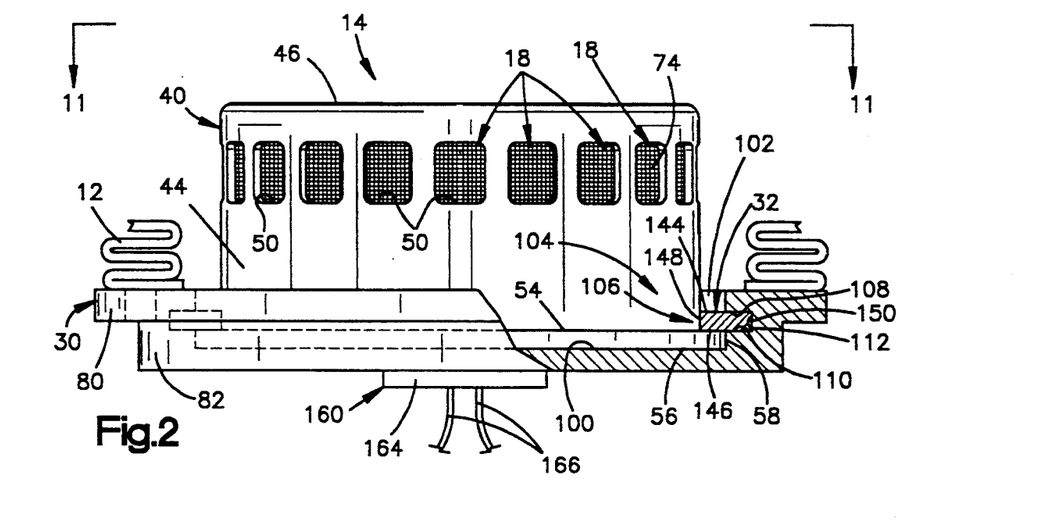
FIG. 2 is a side view, partly in section, of parts of the apparatus of FIG. 1.

FIG. 2 shows the module 22 in a partially assembled condition without the cover 16. As shown in FIG. 2, the module 22 further includes a support member 30 and a connector member 32. The connector member 32 connects the inflator 14 to the support member 30. The air bag 12 is mounted on the support member 30 by any suitable means known in the art. The support member 30 supports the air bag 12 and the inflator 14 on the steering column 24 (FIG. 1).

Figure 3:
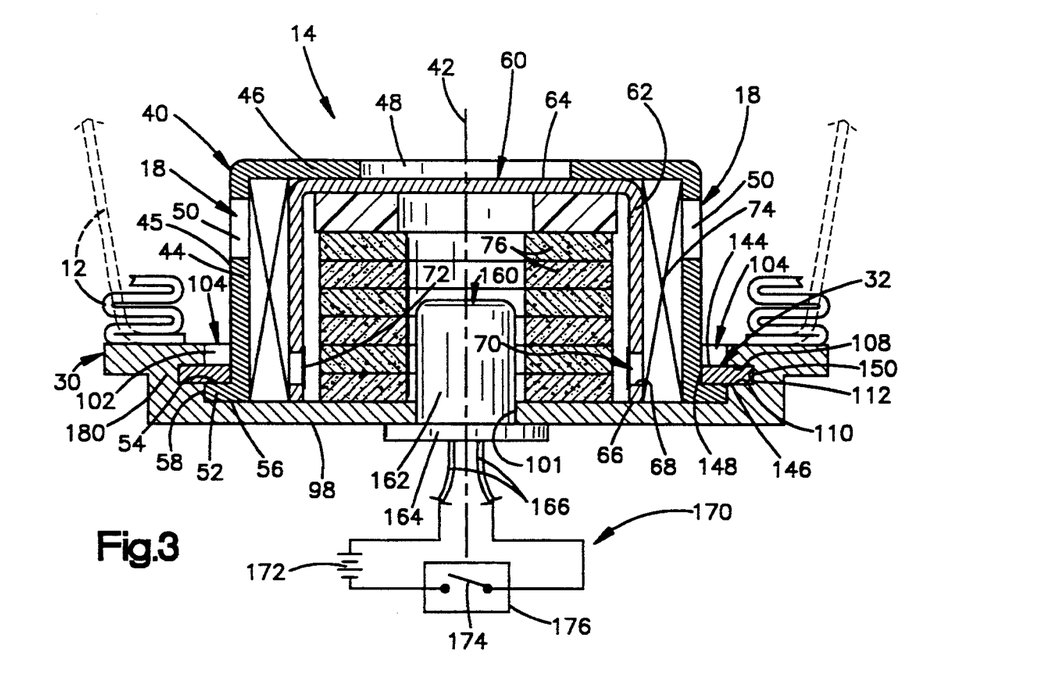
FIG. 3 is a side view, partly in section, showing additional parts of the apparatus of FIG. 1.

As shown in greater detail in FIG. 3, the inflator 14 has a cylindrical housing 40 which is centered on an axis 42. The housing 40 has a cylindrical outer side wall 44 and a circular upper end wall 46. The upper end wall 46 has an inner edge surface 48 which defines an opening centered on the axis 42. The outer side wall 44 has a major outer surface portion 45 with a cylindrical shape, and has a plurality of inner edge surfaces 50. The inner edge surfaces 50 define the gas outlet openings 18 in an array extending circumferentially around the outer side wall 44.

The outer side wall 44 of the housing 40 further has a shoulder portion 52 at its lower end. The shoulder portion 52 has an annular upper surface 54, an annular lower surface 56, and a cylindrical outer surface 58. The annular upper surface 54 and the annular lower surface 56 are perpendicular to the axis 42, and are centered on the axis 42. The cylindrical outer surface 58 also is centered on the axis 42.

The housing 40 further includes a combustion cup 60 which is located radially inward of the outer side wall 44. The combustion cup 60 has a cylindrical side wall 62 and a circular upper end wall 64. The upper end wall 64 of the combustion cup 60 is fixed, such as by welding, to the upper end wall 46 of the housing 40, and closes the opening defined by the inner edge surface 48 of the upper end wall 46. The side wall 62 of the combustion cup 60 has a lower edge surface 66 which lies in the plane of the annular lower surface 56 of the outer side wall 44.

The side wall 62 of the combustion cup 60 also has a plurality of inner edge surfaces 68. The inner edge surfaces 68 define a plurality of gas flow openings 70 in an array extending circumferentially around the side wall 62. A sheet of rupturable pressure-controlling material 72, preferably metal foil, extends circumferentially around the inside of the side wall 62 and covers the gas flow openings 70 at the inside of the side wall 62.

As shown schematically in FIG. 3, the housing 40 contains a filter assembly 74. The filter assembly 74 has an annular shape, and is located in the annular space between the combustion cup 60 and the outer side wall 44. The housing 40 also contains an ignitable gas generating material 76 within the combustion cup 60. Although many known types of gas generating material could be used, preferred gas generating materials are disclosed in U.S. Pat. No. 3,895,098. The gas generating material 76 preferably takes the form of a plurality of stacked rings which define a tubular body. However, the gas generating material 76 could alternatively have any other suitable configuration known in the art. When the gas generating material 76 is ignited, it rapidly produces a large volume of gas for inflating the air bag 12.

The support member 30 is shown fully in FIGS. 4-7. The support member 30 has an upper portion which defines a plate 80, and has a lower portion which defines a base 82. The plate 80 has parallel upper and lower surfaces 84 and 86. The plate 80 further has a rectangular peripheral edge surface 88 and a plurality of cylindrical inner surfaces 90. The inner surfaces 90 define passages 91 through which fasteners 92 can extend to connect the support member 30 directly to the steering column 24 (FIG. 1). Any suitable fasteners can be used to connect the support member 30 to the steering column 24, depending upon the configuration of the hub of the steering wheel 26 or other portion of the steering column 24 to which the support member 30 is to be directly connected. The inner surfaces 90 can be threaded or otherwise configured specifically to receive the particular fasteners used. The plate 80 could alternatively be constructed with distinct portions that receive fasteners, such as, for example, the offset tab portion 93 shown in FIG. 8.

The base 82 of the support member 30 has a cylindrical outer surface 94 which is centered on an axis 96. The base 82 also has a circular outer surface 98 and a circular inner surface 100, both of which are centered on, and perpendicular to, the axis 96. An inner edge surface 101 defines an opening extending through the base 82 along the axis 96. A cylindrical inner surface 102 extends axially from the upper surface 84 of the plate 80 to the circular inner surface 100 of the base 82. The cylindrical inner surface 102 thus defines a cylindrical compartment 104 within the support member 30.

The support member 30 further has surfaces that define a circumferentially extending slot 106. As shown in detail in FIG. 5, those surfaces include a pair of opposed annular surfaces 108 and 110 which are perpendicular to the axis 96. The opposed annular surfaces 108 and 110 extend radially between the cylindrical inner surface 102 and another, larger diameter cylindrical inner surface 112. The cylindrical inner surface 112 also is centered on the axis 96. The slot 106 thus interrupts the cylindrical inner surface 102, and has a rectangular cross-sectional shape extending radially outward from the cylindrical inner surface 102.

Figure 4:
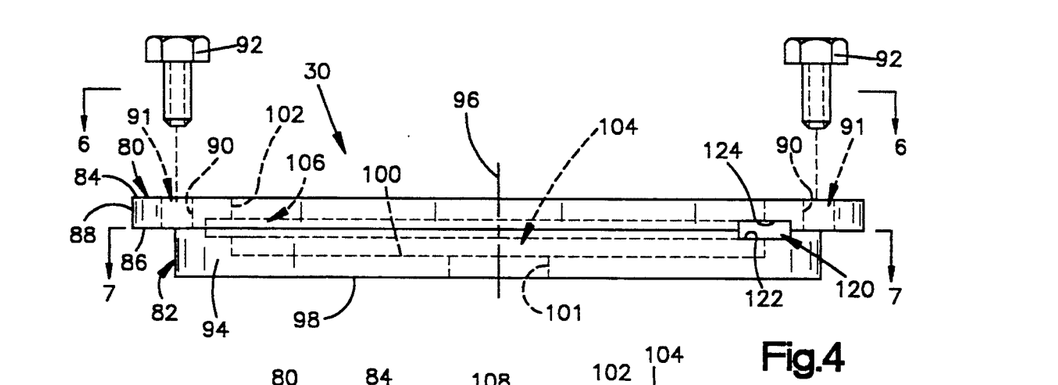
FIG. 4 is a side view of a part shown in FIG. 2.
Figure 5:
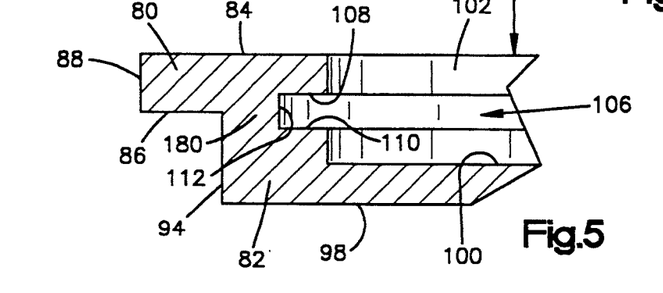
FIG. 5 is an enlarged sectional view of a portion of the part shown in FIG. 4.
Figure 6:
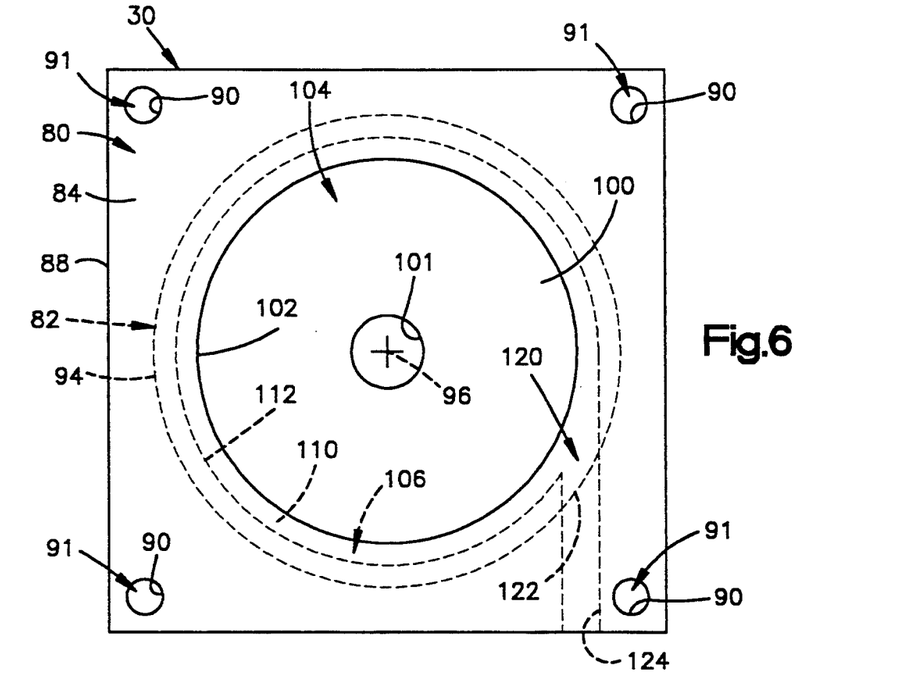
FIG. 6 is a view taken on line 6—6 of FIG. 4.
Figures 7, 8:
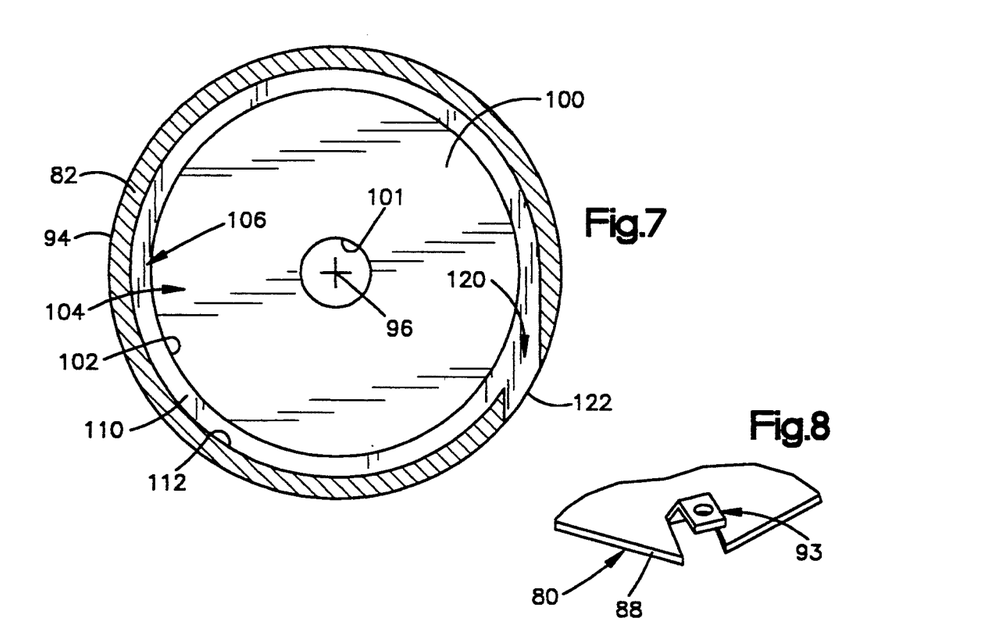
FIG. 7 is a view taken on line 7—7 of FIG. 4.
FIG. 8 is a view of an alternative structural feature of the part shown in FIG. 4.

The support member 30 additionally has surfaces that define an access passage 120. The access passage 120 extends tangentially outward from the compartment 104 and through the slot 106 to an opening 122 at the outer surface 94 of the base 82. The lower surface 86 of the plate 80 has a recessed portion 124. The recessed portion 124 of the lower surface 86 defines a channel shaped extension of the access passage 120 which continues tangentially outward from the opening 122 to the peripheral edge surface 88.

Figures 9, 10:
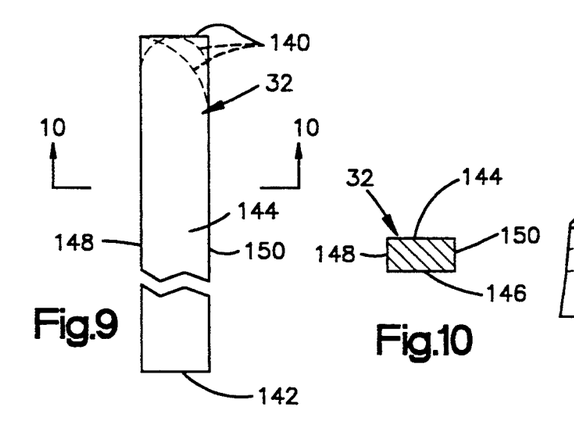
FIG. 9 is a top view of a part shown in FIG. 2.
FIG. 10 is a view taken on line 10—10 of FIG. 9.

As shown in FIGS. 9 and 10, the connector member 32 is an elongated strip with a leading end surface 140 and a trailing end surface 142. The connector member 32 has a rectangular cross-sectional shape defined by an upper surface 144, a lower surface 146, and opposite side surfaces 148 and 150.

The inflator 14, the support member 30 and the connector member 32 are assembled into the positions shown in FIG. 2 by first moving the inflator housing 40 axially into the compartment 104 in the support member 30. The housing 40 is thus moved into the compartment 104 until the lower surfaces 56 and 66 on the housing 40 (FIG. 3) abut the circular inner surface 100 of the support member 30 at the bottom of the compartment 104. The entire circumference of the cylindrical outer surface 58 on the shoulder portion 52 of the housing 40 then adjoins the cylindrical inner surface 102 on the support member 30. The annular upper surface 54 on the shoulder portion 52 is coplanar with the annular surface 110 in the slot 106.

After the housing 40 is moved into the compartment 104 in the support member 30, the connector member 32 is moved longitudinally into the slot 106 through the access passage 120. The connector member 32 is first moved longitudinally along the channel shaped portion of the access passage 120 which extends beneath the plate 80, and is then moved inward through the opening 122 toward the slot 106. When the leading end surface 140 of the connector member 32 reaches the cylindrical surface 112 in the slot 106, it is moved forcibly against the cylindrical surface 112 in the slot 106. The contour of the cylindrical surface 112 then directs the connector member 32 to deflect and turn circumferentially around the axis 96 upon further longitudinal movement of the connector member 32 into and along the length of the slot 106. The connector member 32 is thus moved into an installed position in which, it has a circular configuration extending circumferentially along the length of the slot 106, as shown in FIG. 11.

Figure 11:
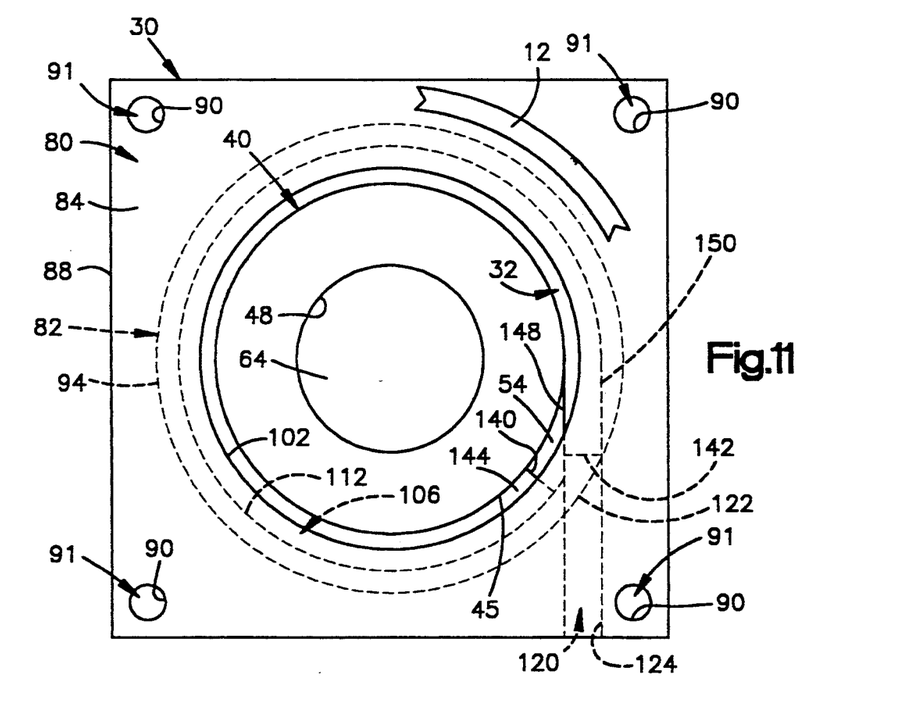
FIG. 11 is a view taken on line 11—11 of FIG. 2.

The connector member 32 is formed of a flexible material, preferably spring steel, which enables it to be deflected into a circular configuration when it is moved into the installed position of FIG. 11 in the foregoing manner. The leading end surface 140 can be rounded or tapered, as indicated in dashed lines in FIG. 9, to enable the connector member 32 to slide more easily against the cylindrical surface 112 in the slot 106. Any suitable hardware can be used to move the connector member 32 forcibly into and along the slot 106.

When the connector member 32 is in the installed position, as shown in FIGS. 2 and 3, the lower surface 146 of the connector member 32 overlies and adjoins the coplanar annular surfaces 54 and 110 on the housing 40 and in the slot 106, respectively, in firm abutting contact. The upper surface 144 of the connector member 32 extends beneath, and adjoins, the annular surface 108 in the slot 106 in firm abutting contact. The opposite side surfaces 148 and 150 of the connector member 32 extend around, and adjoin, the major outer surface portion 45 of the housing 40 and the cylindrical surface 112 in the slot 106, respectively, in firm abutting contact. The abutting surfaces of the connector member 32, the housing 40, and the support member 30 block movement of the housing 40 both axially and radially relative to the support member 30. The connector member 32 thus establishes a mechanical interlock between the housing 40 and the support member 30 which holds the housing 40 securely in the compartment 104.

As further shown in FIG. 11, the opposite longitudinal end surfaces 140 and 142 of the connector member 32 are slightly spaced from each other radially and circumferentially. Nonetheless, the connector member 32 extends circumferentially around the axis 96 in a substantially complete circle so that the adjoining surfaces of the connector member 32, the housing 40 and the support member 30 which block movement of the housing 40 relative to the support member 30, as described above, are disposed in abutting contact with each other substantially entirely around the circumference of the housing 40. The spacing between the opposite longitudinal end surfaces 140 and 142 could be greater or less than shown in FIG. 11, but the circumferential extent of the connector member 32 is preferred to be as great as possible so that abutting surface areas are maximized.

Figure 12:
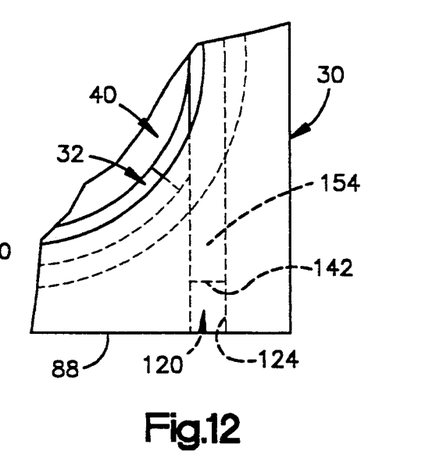
FIG. 12 is a view of an alternative structural feature of a part shown in FIG. 11.

The connector member 32 could alternatively be made longer so that the trailing end surface 142 remains outside the opening 122 in the support member 30 when the connector member 32 is moved into the installed position, as shown in FIG. 12. The connector member 32 would then have an outwardly extending trailing end portion 154 which could be grasped outside the support member 30 for withdrawal of the connector member 32 and disassembly of the apparatus 10.

Importantly, the connector member 32 connects the housing 40 securely to the support member 30 without the need for welding between the housing 40 and the support member 30. The housing 40 and the support member 30 can, therefore, be formed of dissimilar metals. The present invention thus enables the housing 40 and the support member 30 to be formed of steel and aluminum, respectively, which are the preferred materials for those parts.

The inflator 14 further includes an ignitor 160, as shown in FIG. 3. After the housing 40 is connected to the support member 30 by the connector member 32 as described above, the igniter 160 is inserted upwardly through the opening at the center of the support member 30. The ignitor 160 is of known construction, and includes a cylindrical casing 162 and a circular base 164. The base 164 is fixed to the circular outer surface 98 of the support member 30 by any suitable means known in the art. The casing 162 extends axially into the combustion cup 60 in the housing 40 and contains a pyrotechnic charge. The pyrotechnic charge can be formed of any suitable pyrotechnic material known in the art. The ignitor 160 is actuated upon the passage of electric current through the ignitor 160 between a pair of lead wires 166.

As shown schematically in FIG. 3, the vehicle occupant restraint apparatus 10 further includes an electrical circuit 170. The electrical circuit 170 includes a power source 172, which is preferably the vehicle battery or a capacitor, and a normally open switch 174. The switch 174 is preferably part of a deceleration sensor 176. The deceleration sensor 176 senses the occurrence of a predetermined amount of vehicle deceleration indicative of a collision, and closes the switch 174 upon sensing the occurrence of such deceleration. Electric current then passes between the lead wires 166 in the ignitor 160 to actuate the ignitor 160.

When the ignitor 160 is actuated, the pyrotechnic charge in the casing 162 is ignited and produces products of combustion. The products of combustion produced by the burning pyrotechnic charge rupture the casing 162 and emerge from the ignitor 160 in the combustion cup 60. The products of combustion emerging from the ignitor 160 move against and ignite the gas generating material 76. The gas generating material then burns in the combustion cup 60 and produces products of combustion including heat, hot particles and a large volume of gas.

The gas generated in the combustion cup 60 is at first confined within the combustion cup 60 by the sheet 72 of rupturable pressure-controlling material which extends over the gas flow openings 70. When the pressure of the gas in the combustion cup 60 reaches a predetermined elevated level, the gas ruptures the sheet of rupturable pressure-controlling material 72 and emerges from the combustion cup 60 through the gas flow openings 70. The annular filter assembly 74 then cools the gas and removes hot particles from the gas as the gas flows radially outward and axially upward through the annular filter assembly 74. The flow of gas continues outward from the housing 40 through the gas outlet openings 18 to inflate the air bag 12. The air bag 12 is thus inflated from the folded condition to an inflated condition, as indicated in dashed lines in FIG. 3, upon the occurrence of a vehicle collision.

When the inflator 14 operates to inflate the air bag 12 in the foregoing manner, the gas pressure in the housing 40 increases rapidly to an elevated level. The gas pressure acts axially upward against the upper end walls 46 and 64 of the housing 40, and acts axially downward against the inner surface 100 of the support member 30. The gas pressure thus urges the housing 40 to separate axially from the support member 30. However, the connector member 32 withstands the force exerted axially between the housing 40 and the support member 30 without deflecting or moving from its installed position, as shown in FIGS. 2 and 3. Specifically, the gas pressure in the housing 40 causes a force to be applied axially upward against the lower surface 146 of the connector member 32 from the annular upper surface 54 on the shoulder portion 52 of the housing 40. That axial force is transmitted through the connector member 32 in shear and bending components which are applied against the surfaces 108, 110 and 112 in the slot 106 by the respective abutting surfaces 144, 146 and 150 of the connector member 32. The connector member 32 and the support member 30 withstand those components of the gas pressure force without deflecting or breaking, and thus hold the housing 40 in the position shown in FIGS. 2 and 3 when the air bag 12 is being inflated.

The gas pressure in the housing 40 also acts radially outward against the outer side wall 44 of the housing 40. The gas pressure thus causes a force to be applied radially outward against the cylindrical inner surface 102 of the support member 30 from the cylindrical outer surface 58 on the shoulder portion 52 of the housing 40. The gas pressure similarly causes a force to be applied radially outward against the side surface 148 of the connector member 32 from the major outer surface portion 45 of the housing 40. That force is transmitted radially through the connector member 32, and is applied radially outward against the cylindrical surface 112 in the slot 106 by the abutting side surface 150 of the connector member 32. The support member 30 and the connector member 32 withstand such radial forces without deflecting or breaking.

In accordance with a particular feature of the present invention, the location of the slot 106 along the axis 42 is at least partially in line with the axial location of the plate 80. A weakened portion 180 of the support member 30, which results from formation of the slot 106, is thus located at least partially beside the plate 80. The connector member 32 and the weakened portion 180 of the support member 30 can, therefore, transmit a radial gas pressure force directly to the plate 80 and the fasteners 92 that extend through the plate 80. The connector member 32 and the support member 30 can thus transmit a substantial portion of the total radial gas pressure force to the steering column 24 through the fasteners 92. This ensures that the weakened portion 180 of the support member 30 will not have to bear the entire force that is applied radially outward from the housing 40 through the connector member 32.

As described above, the wall structure of the inflator housing 40 in the first embodiment of the present invention is open at the lower end of the housing 40. More specifically, the annular space between the combustion cup 60 and the outer side wall 44 is open at the lower end of the housing 40, and the cylindrical space within the combustion cup 60 also is open at the lower end of the housing 40. The circular inner surface 100 of the support member 30 extends radially across the lower end of the housing 40 from the ignitor 160 to the cylindrical outer surface 58 of the housing 40. The support member 30 and the ignitor 160 thus establish a closure across the lower end of the housing 40. As a result, the support member 30 and the inflator 14 effectively define a two part housing structure which contains the gas generating material 76 in a closed combustion chamber.

An inflator constructed in accordance with the present invention can have an alternative structure which defines a closed combustion chamber independently of a support member which supports the inflator on a vehicle steering wheel. Parts of a second embodiment of the invention, including an inflator 200 having such an alternative structure, are shown in FIG. 13.

Figure 13:
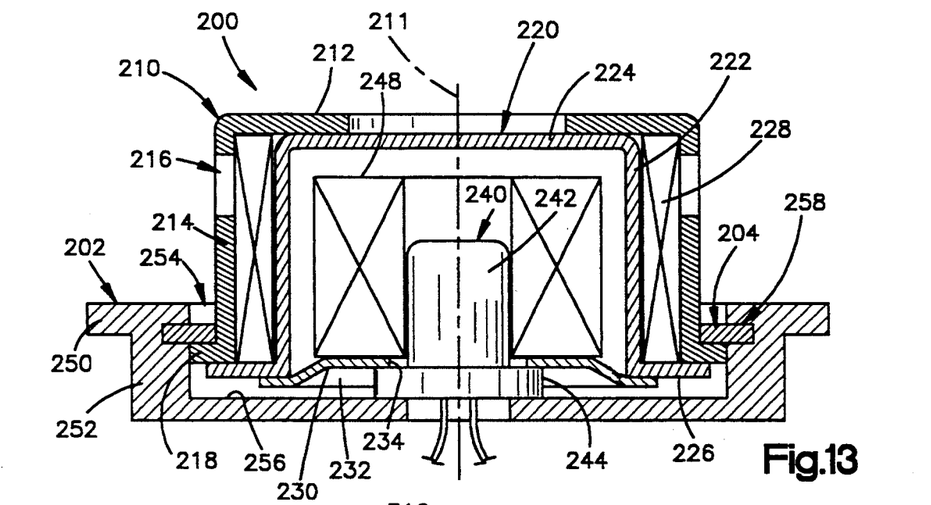
FIG. 13 is a side view of parts of a vehicle occupant restraint apparatus constructed as a second embodiment of the present invention.

As shown in FIG. 13, the second embodiment of the invention includes the inflator 200, a support member 202 and a connector member 204. The connector member 204 connects the inflator 200 to the support member 202.

The inflator 200 has a cylindrical housing 210 centered on an axis 211. Like the housing 40 described above, the housing 210 has an upper end wall 212, and also has an outer side wall 214 with gas outlet openings 216 and a lower shoulder portion 218. The housing 210 further includes a cylindrical combustion cup 220. Like the combustion cup 60 described above, the combustion cup 220 has a side wall 222 and an upper end wall 224. However, unlike the side wall 62 of the combustion cup 60, the side wall 222 of the combustion cup 220 has a lower end portion defining a circular flange 226. The flange 226 extends radially outward beneath the shoulder portion 218 of the outer side wall 214, and is welded to the shoulder portion 218. The flange 226 thus closes the lower end of the annular space which is defined between the combustion cup 220 and the outer side wall 214. An annular filter assembly 228 is contained within the annular space between the combustion cup 220 and the outer side wall 214.

The housing 210 further has a circular lower end wall 230 which is centered on the axis 211. The lower end wall 230 extends radially beneath the flange 226 on the side wall 222 of the combustion cup 220, and is welded to the flange 226. The lower end wall 230 has a lower side surface 232, and has an inner edge surface 234 which defines an opening centered on the axis 211.

An ignitor 240 has a cylindrical casing 242 which extends axially into the combustion cup 220 through the opening in the lower end wall 230. The ignitor 240 also has a circular base 244 which is fixed to the lower side surface 232 of the lower end wall 230. The ignitor 240 and the lower end wall 230 thus close the lower end of the combustion cup 220. A quantity of ignitable gas generating material 248 is contained in the closed combustion chamber that is thus defined within the combustion cup 220.

As further shown in FIG. 13, the support member 202 in the second embodiment of the invention is substantially similar to the support member 30 described above with reference to the first embodiment of the invention. The support member 202 thus has an upper portion which defines a plate 250, a lower portion which defines a base 252, and a cylindrical compartment 254 which is centered on the axis 211. The support member 202 further has a circular inner surface 256 at the bottom of the compartment 254, and a plurality of inner surfaces defining a slot 258 which extends radially outward from the compartment 254 and circumferentially around the axis 211.

The inflator 200, the support member 202 and the connector member 204 are assembled into the positions shown in FIG. 13 by first moving the inflator housing 210 axially into the compartment 254 in the support member 202. The housing 210 is thus moved into the compartment 254 until the circular base 244 of the ignitor 240 abuts the circular inner surface 256 of the support member 202 at the bottom of the compartment 254. When the housing 210 is thus received in the compartment 254, the shoulder portion 218 of the housing 210 is located adjacent to the slot 258 in the support member 202, just as the shoulder portion 52 of the housing 40 is located adjacent to the slot 106 in the support member 30 in the first embodiment of the invention described above. However, the support member 202 differs slightly from the support member 30 in that the compartment 254 is relatively deeper than the compartment 104. The compartment 254 is relatively deeper in order to accommodate the relatively greater axial length of the housing 210 which results from the thicknesses of the flange 226 and the lower end wall 230, as well as to accommodate the axially protruding thickness of the base 244 of the ignitor 242. Alternatively, the shoulder portion 218 of the housing 210 could be constructed with an appropriately lesser axial thickness so that the support member 202 would have the same proportions as the support member 30 described above.

The connector member 204 is the same as the connector member 32 described above, and is moved into the installed position shown in FIG. 13 in the same manner that the connector member 32 is moved into the installed position shown in FIG. 3. The connector member 204 thus establishes a mechanical interlock between the housing 210 and the support member 202 which holds the housing 210 securely in the compartment 254.

Figure 14:
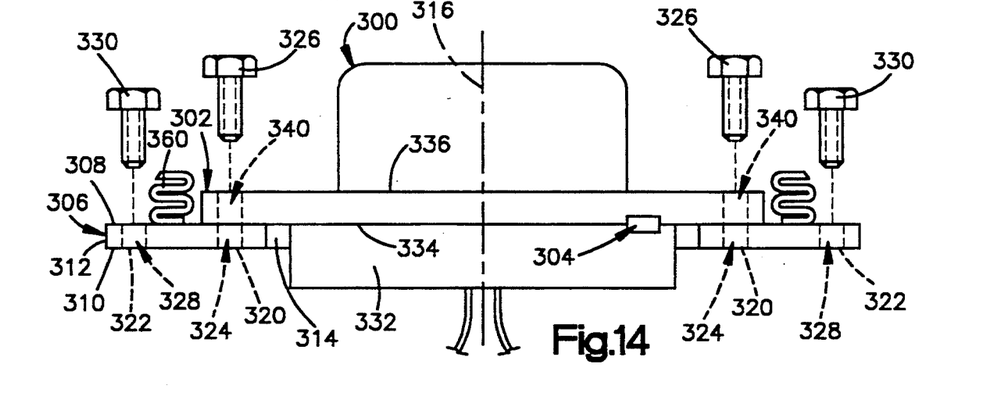
FIG. 14 is a side view of parts of a vehicle occupant restraint apparatus constructed as a third embodiment of the present invention.

Parts of a vehicle occupant restraint apparatus constructed as a third embodiment of the present invention are shown in FIG. 14. The third embodiment of the invention also includes an inflator 300, a support member 302 and a connector member 304. The inflator 300, the support member 302 and the connector member 304 are constructed like the corresponding parts of either the first or second embodiment of the invention described above. The third embodiment of the invention differs from the first and second embodiments in that the third embodiment includes a supplemental support member 306.

The supplemental support member 306 is a flat plate having upper and lower planar surfaces 308 and 310, a rectangular peripheral edge surface 312, and a cylindrical inner edge surface 314. The inner edge surface 314 defines an opening centered on an axis 316. The supplemental support member 306 further has a set of first cylindrical inner surfaces 320 and a set of second cylindrical inner surfaces 322. The first cylindrical inner surfaces 320 define passages 324 for receiving fasteners 326. The second cylindrical inner surfaces 322 define passages 328 for receiving fasteners 330.

The inflator 300 is connected to the support member 302 by the connector member 304 in the manner described above with reference to the first and second embodiments of the invention. The support member 302, with the inflator 300 and the connector member 304 attached, is then moved into the position shown in FIG. 14 by moving a base portion 332 of the support member 302 axially through the opening at the center of the supplemental support member 306. The support member 302 is thus moved into a position in which a lower planar surface 334 on a plate portion 336 of the support member 302 abuts the upper planar surface 308 on the supplemental support member 306. Each one of a plurality of passages 340 extending through the plate portion 336 is then aligned with a respective one of the passages 324 extending through the supplemental support member 306. The fasteners 326 are inserted through the aligned passages 340 and 324 to connect the support member 302 to the supplemental support member 306. The supplemental support member 306 is connected directly to the steering column 24 by the fasteners 330. As shown in FIG. 14, an air bag 360 is mounted on the planar upper surface 308 of the supplemental support member 306, but alternatively could be mounted on the support member 302 as in the first two embodiments of the invention described above.

From the above description of the invention, those skilled in the art will perceive improvements, changes and modifications. For example, although the present invention has been specifically described as securing an inflator housing 40 to a support member 30, it could also be used to secure a cover to an inflator housing. In such an arrangement, the inflator housing could have an internal circumferential slot like the slot 106, and the cover would be received within the housing. A connector member, like the connector member 32, would be inserted into the slot to abut a surface of the cover and an axially oppositely facing surface of the slot to block axial movement of the cover in the housing. Such improvements, changes and modifications within the skill of the art are intended to be covered by the appended claims.

Having described the invention, the following is claimed:

1. Apparatus comprising:
   an inflatable vehicle occupant restraint;
   inflating means for inflating said restraint, said inflating means including an inflator housing which comprises a first structure containing a source of inflation fluid for inflating the restraint, said first structure having a plurality of fluid outlet openings, said first structure further having a cylindrical wall surface centered on an axis and a first annular surface portion facing in a first direction along said axis;
   a second structure having a cylindrical surface which extends circumferentially around said axis, said second structure further having a second annular surface portion facing in a second direction along said axis opposite said first direction; and
   connecting means for connecting said first structure to said second structure, said connecting means including an elongated flexible connector member having first and second opposite longitudinal end surfaces, said connector member having an installed position extending circumferentially around said axis between said cylindrical wall surface of said first structure and said cylindrical surface of said second structure, said connector member having first and second abutment surface portions which respectively abut said first and second annular surface portions of said first and second structures when said connector member is in said installed position, said connector member thus blocking movement of said first and second structures axially relative to each other when said connector member is in said installed position;
   one of said structures further having surface means for defining a passage through which said connector member can move longitudinally into said installed position in a direction transverse to said axis upon longitudinal movement of said connector member through said passage.

2. Apparatus as defined in claim 1 wherein said cylindrical surface of said second structure defines a cylindrical compartment in which said first structure is received, said second structure having said surface means for defining said passage.

3. Apparatus as defined in claim 2 wherein said direction is tangential to said cylindrical compartment.

4. Apparatus as defined in claim 2 wherein said passage enables said connector member to move longitudinally out of said cylindrical compartment upon longitudinal movement of said connector member through said passage.

5. Apparatus as defined in claim 2 wherein said first longitudinal end surface of said connector member is located within said cylindrical compartment, said second longitudinal end surface of said connector member being located outside of said cylindrical compartment.

6. Apparatus as defined in claim 2 wherein said first annular surface portion of said first structure and said second annular surface portion of said second structure face toward each other along said axis, said connector member extending axially between said first and second annular surface portions.

7. Apparatus as defined in claim 6 wherein said second structure further has surface means for defining a slot having a length extending circumferentially around said cylindrical compartment and a width extending radially outward from said cylindrical compartment, said second annular surface portion of said second structure being located in said slot, said first abutment surface portion of said connector member extending radially from said first annular surface portion of said first structure into said slot.

8. Apparatus as defined in claim 7 wherein said second structure has a plate portion which is generally perpendicular to said axis, said slot having a position along said axis which is at least partially in line with the axial position of said plate portion.

9. Apparatus as defined in claim 8 wherein said plate portion of said second structure has surface means for connecting said second structure to the vehicle, and further has surface means for supporting said restraint on said second structure.

10. Apparatus as defined in claim 1 wherein said first and second opposite longitudinal end surfaces of said connector member are spaced from each other circumferentially about said axis.

11. Apparatus as defined in claim 1 wherein the cross-sectional shape of said connector member is rectangular.

12. Apparatus as defined in claim 1 wherein said first structure and said second structure are formed of dissimilar metals.

13. Apparatus as defined in claim 12 wherein said first structure is formed of steel and said second structure is formed of aluminum.

14. Apparatus as defined in claim 1 wherein said first structure has wall means for defining said cylindrical wall surface of said first structure, said wall means further defining a closed upper end of said first structure and an open lower end of said first structure, said second structure having a wall surface extending across said open lower end of said first structure, said first structure and said second structure thus defining a combustion chamber extending axially from said closed upper end of said first structure to said wall surface of said second structure, said source of inflation fluid being contained within said combustion chamber.

15. Apparatus as defined in claim 14 wherein said second structure has a planar surface upon which said restraint is mounted in a folded condition.

16. Apparatus as defined in claim 1 wherein said second structure has supporting means for supporting said restraint on said second structure, said second structure further having mounting means for mounting said second structure on a vehicle steering column.

17. Apparatus as defined in claim 16 wherein said second structure comprises a support member including both said supporting means and said mounting means.

18. Apparatus comprising:
    an inflatable vehicle occupant restraint;
    inflating means for inflating said restraint, said inflating means including an inflator housing which comprises a first structure containing a source of inflation fluid for inflating the restraint, said first structure having a plurality of fluid outlet openings, said first structure further having a cylindrical wall surface centered on a axis and a first annular surface portion facing in a first direction along said axis;

a second structure having a cylindrical surface which extends circumferentially around said axis, said second structure further having a second annular surface portion facing in a second direction along said axis opposite said first direction; and connecting means for connecting said first structure to said second structure, said connecting means including an elongated flexible connector member having first and second opposite longitudinal end surfaces, said connector member having an installed position extending circumferentially around said axis between said cylindrical wall surface of said first structure and said cylindrical surface of said second structure, said connector member having first and second abutment surface portions which respectively abut said first and second annular surface portions of said first and second structures when said connector member is in said installed position, said connector member thus blocking movement of said first and second structures axially relative to each other when said connector member is in said installed position.

19. Apparatus as defined in claim 18 wherein said second structure has a plate portion which is generally perpendicular to said axis, said plate portion of said second structure having surface means for supporting said restraint on said second structure and further having surface means for connecting said second structure to the vehicle, said installed position of said connector member being at least partially in line with the axial position of said plate portion of said second structure.

20. Apparatus as defined in claim 18 wherein said first structure has wall means for defining said cylindrical wall surface of said first structure, said wall means further defining a closed upper end of said first structure and an open lower end of said first structure, said second structure having a wall surface extending across said open lower end of said first structure, said first structure and said second structure thus defining a combustion chamber extending axially from said closed upper end of said first structure to said wall surface of said second structure, said source of inflation fluid comprising an ignitable gas generating material contained within said combustion chamber, said second structure further having a planar surface upon which said restraint is mounted in a folded condition.

21. Apparatus as defined in claim 20 wherein said second structure further has mounting means for mounting said second structure on a vehicle steering column.

* * * * *